United States Patent [19]
Bjalme et al.

[11] 3,831,256
[45] Aug. 27, 1974

[54] PLASTIC PIPE ASSEMBLY TOOL

[75] Inventors: Bengt G. Bjalme; Thomas G. Brown, both of Erie, Pa.

[73] Assignee: Reed Manufacturing Company, Erie, Pa.

[22] Filed: Apr. 26, 1973

[21] Appl. No.: 354,891

[52] U.S. Cl. .............................................. 29/237
[51] Int. Cl. ............................................. B23p 19/04
[58] Field of Search ........ 29/237, 234, 282; 254/95, 254/97, DIG. 6

[56] References Cited
UNITED STATES PATENTS

| | | | |
|---|---|---|---|
| 1,584,198 | 5/1926 | Stevens | 254/97 |
| 3,364,555 | 1/1968 | Swink | 29/237 |
| 3,426,417 | 2/1969 | Austin | 29/237 |
| 3,653,115 | 4/1972 | Perkins | 29/282 |
| 3,710,427 | 1/1973 | Doty | 29/237 |

Primary Examiner—James L. Jones, Jr.
Attorney, Agent, or Firm—Ralph Hammar

[57] ABSTRACT

A tool for assembling telescoping sections of plastic pipes or fittings having an axially extending beam over which are telescoped a pair of axially extending brackets, one of which is fixed to the beam and the other of which is slidable on the beam. Pipe engaging shoes are mounted on the brackets by interengaging knuckles and pins and have semicylindrical surfaces clamped to the pipe by link chains. The movable bracket is reciprocated by a rack and pinion drive which in a preferred form consists of a link chain fixed to the beam and a sprocket journaled in the movable bracket and rotated by a ratchet drive.

8 Claims, 2 Drawing Figures

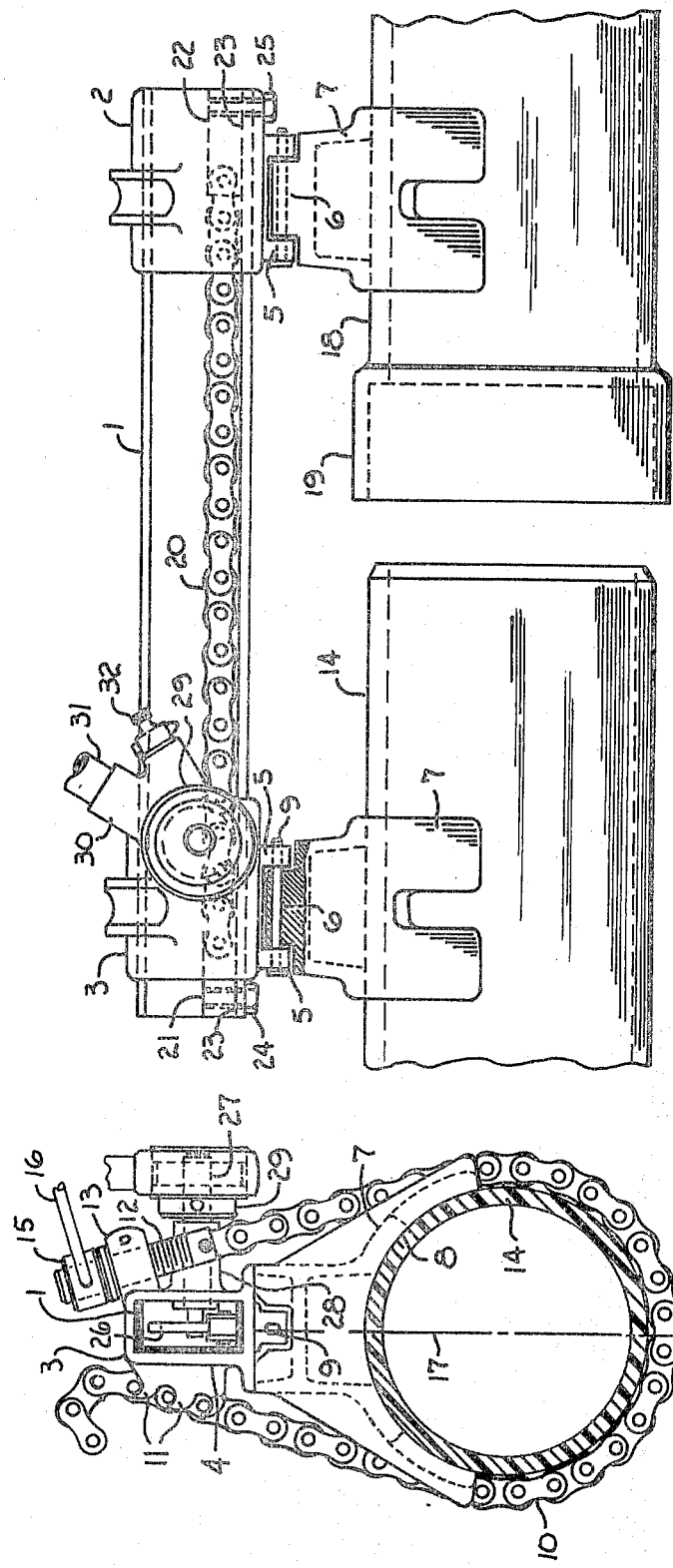

PLASTIC PIPE ASSEMBLY TOOL

This invention is intended to assemble and disassemble telescoping sections of plastic pipe and fittings or the like. Prior to assembly, the joint surfaces are coated with cement or with a solvent which provides a cement surface and after this coating, the joint sections must be quickly and positively telescoped together. In order to create a pressure tight joint, the tool accurately aligns the axes of the telescoping section and maintains the alignment during the assembly or disassembly.

In the drawing,

FIG. 1 is a side elevation of the tool and

FIG. 2 is an end elevation of the movable bracket and the associated pipe.

The frame of the tool consists of a longitudinal beam or channel 1 on which are telescoped a stationary bracket 2 and a movable bracket 3. In addition to sustaining the assembly and disassembly forces, the beam positions the brackets 2, 3 in axial alignment with each other and serves as a frame and guideway which maintains the alignment as the movable bracket 3 slides along the beam. Both of the brackets comprise a body 4 having knuckles 5 on its under side straddling a knuckle 6 at the upper end of a shoe 7 having a semicylindrical pipe engaging surface 8. The diameter of the surface 8 matches the outer surface of the pipe and the longitudinal axis of the surface 8 is parallel to the longitudinal axis of the beam 1. When clamped against a pipe, the angular and axial extent of the surface 8 is enough to compel the axes of the surface and pipe to be brought into coincidence without distorting the relatively flexible pipe. The interfitting knuckles 5, 6 are connected by a pin 9 parallel to the axes of the surfaces 8 and channel 1. The pin 9 permits easy change to shoes of different size.

The shoe 7 of the movable bracket 3 is tightened into gripping engagement with pipe section 14 by a link chain or other flexible member 10 having one end adjustably received in lugs 11 and the other end fastened to a screw 12 slidably extending through lugs 13. The chain is first wrapped around the pipe 14 and the free end engaged with lugs 11. The chain is then tightened to pull the pipe into gripping engagement with the surfaces 8 by a nut 15 turned by a handle 16. The flexibility of the chain distributes the gripping force to prevent distortion of the pipe. As the chain is tightened, the pipe is brought into alignment with a vertical axis 17 extending through the center of the pipe 14, pin 9 and channel 1. The stationary bracket 2 has the same structure for tightening its shoe 7 against a section 18 of pipe and for aligning the pipe on axis 17. Except for the boss 28, the body 4 of the movable bracket 3 is the same as the body of the stationary bracket 2. Since both brackets 2, 3 have bodies and shoes of the same structure, when the pipe section 18 is clamped to the fixed bracket 2, its axis will be in alignment with the axis of the pipe section 14. The pipe section 18 is shown as having a bell 19 into which the pipe section 14 is to be telescoped.

The movable bracket 3 is reciprocated relative to the stationary bracket 2 by a rack and pinion drive. The rack consists of a link chain 20 having one end fixed to lug 21 and the opposite end fixed to lug 22. The chain is centered on the axis 17. The lug 21 is fixed to flange 23 of the channel 1 by screw 24 and the lug 22 is fixed to flange 23 by screw 25. The screw 25 also fixes the bracket 2 to the flange 23. The pinion consists of a sprocket 26 fixed to a shaft 27 journaled in a boss 28 on movable bracket 3. On the projecting end of the shaft 27 is fixed a conventional ratchet drive 29 having a socket 30 for a handle 31 and a control 32 for reversing the direction of the ratchet. Reciprocation of the handle 31 about the axis of the shaft 27 causes movement of the movable bracket 3 to the right or to the left as viewed in FIG. 1, depending upon the setting of the ratchet control 32. The ratchet drive and control constitute a commercially available part.

In the use of the tool for assembly of plastic pipe sections 14, 18, the sections are first clamped to the shoes 7 thereby causing the longitudinal axes of the sections to be brought into alignment, the joint surfaces are coated with an adhesive or solvent, the ratchet drive control is set to cause movable bracket 3 to approach stationary bracket 2 and the handle 31 is oscillated until the joint surfaces are fully telescoped. To adapt the tool for assembly or disassembly of fittings, the shoe 7 which is to be associated with the fitting should be removed and another shoe substituted which conforms to the fitting.

What is claimed is:

1. A tool for assembling and disassembling telescoping sections of plastic pipe, fittings and the like comprising a longitudinal beam of non-circular crosssection, a bracket telescoped over and slideable along the beam, said beam serving as a frame and guideway which maintains the bracket in alignment with a longitudinal axis as it slides along the beam, means for clamping the bracket to one of two telescoping sections to be assembled or disassembled, the clamping means comprising a shoe on the bracket having a semicylindrical surface parallel to said longitudinal axis and matching the outer surface of said one section and a flexible member encircling the section and pulling the section against said semicylindrical surface, the axial and angular extent of said semicylindrical surface being enough to compel the axes of the semicylindrical surface and of said one section to be brought into coincidence without distorting the relatively flexible plastic pipe, means for holding the other section in fixed relation to said beam and in alignment with said one section, and means for sliding said bracket along said beam to telescope said one section with said other section.

2. The tool of claim 1 in which the beam is a channel.

3. The tool of claim 1 in which the shoe and bracket having interfitting knuckles connected by a pin parallel to said longitudinal axis and on a vertical axis extending through the center of said one section, pin, and beam.

4. The tool of claim 2 in which the means for moving said bracket comprises rack means fixed on one of the interior sides of the channel, a pinion on shaft means journaled on said bracket and having an end projecting into the space between the flanges of the channel and meshing with said rack means, and means for rotating the shaft means.

5. The tool of claim 4 in which the rack means comprises a chain fixed at opposite ends to the channel and the pinion comprises a sprocket.

6. The tool of claim 1 in which the means for holding said other section in alignment with the first section comprises another bracket fixed to the beam and means for clamping said other bracket to said other section, the clamping means comprising a shoe having a semicylindrical surface matching the outer surface of said other section and a flexible member encircling said other section and pulling the section against said surface, the axial and angular extent of said surface being enough to compel the axes of the surface and said other section to be brought into alignment and the axes when aligned being parallel to said longitudinal axis and in alignment with the first section.

7. The tool of claim 6 in which the beam is a channel and said brackets are telescoped over the channel.

8. The tool of claim 1 in which the beam has vertically spaced upper and lower longitudinal flanges.

* * * * *